No. 746,260. PATENTED DEC. 8, 1903.
R. BAGGALEY.
METHOD OF RECOVERING VALUES FROM SILICIOUS ORES.
APPLICATION FILED SEPT. 24, 1903.
NO MODEL.
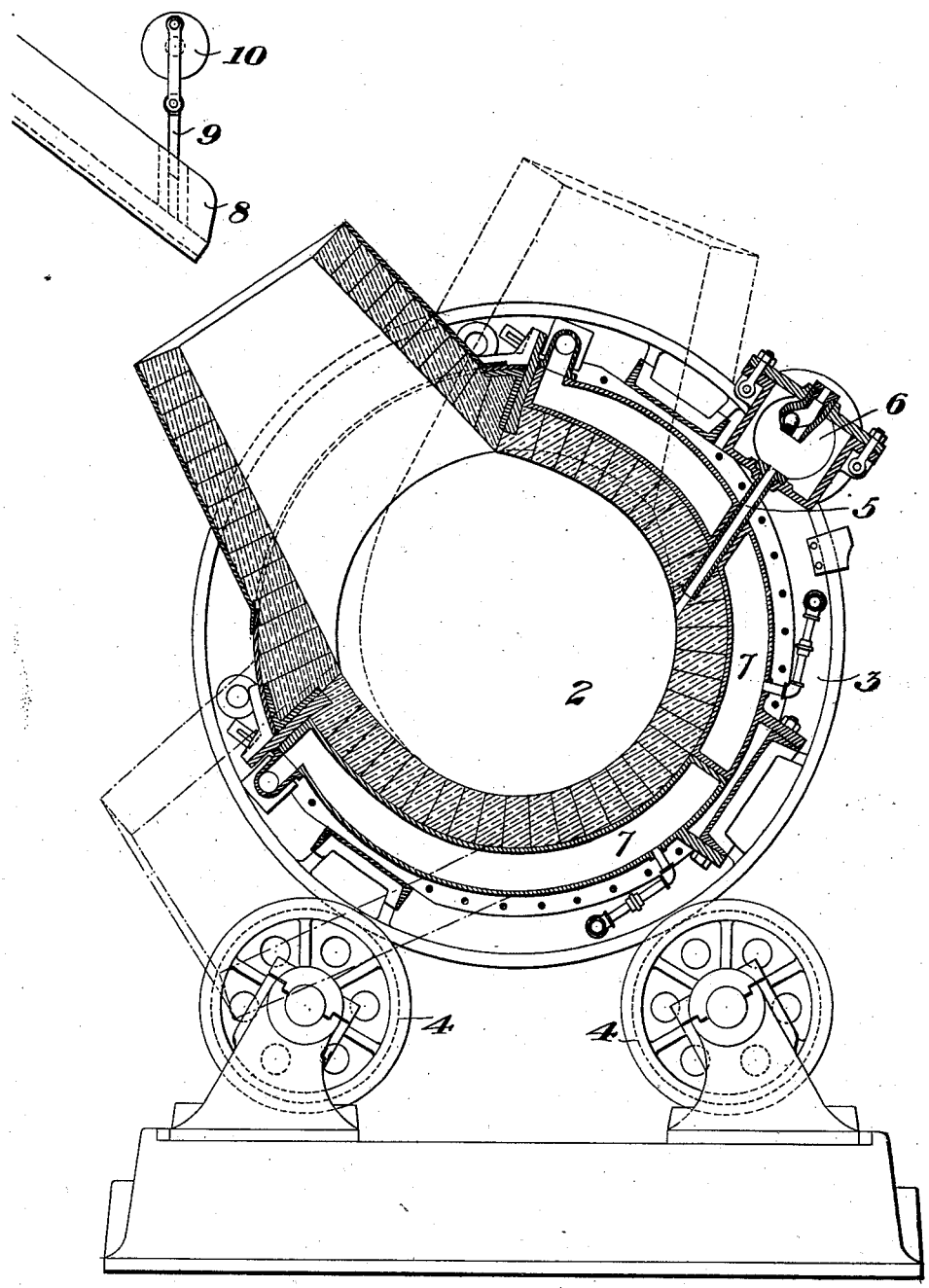
WITNESSES
INVENTOR
Ralph Baggaley
by Bakewell & Byrnes
his Attorneys No. 746,260. Patented December 8, 1903.

UNITED STATES PATENT OFFICE.

RALPH BAGGALEY, OF PITTSBURG, PENNSYLVANIA.

METHOD OF RECOVERING VALUES FROM SILICIOUS ORES.

SPECIFICATION forming part of Letters Patent No. 746,260, dated December 8, 1903.

Application filed September 24, 1903. Serial No. 174,431. (No model.)

*To all whom it may concern:*

Be it known that I, RALPH BAGGALEY, of Pittsburg, in the county of Allegheny and State of Pennsylvania, have invented a new and useful Method of Recovering Values from Silicious Ores through the Medium of a Cheap Fire Concentration, of which the following is a full, clear, and exact description, reference being had to the accompanying drawing, which shows in vertical section apparatus suitable for the practice of my invention.

My invention relates to a new and cheap method of recovering values—such, for instance, as copper, gold, silver, nickel, cobalt, and other metals—from ores of any kind; but my process will be found especially valuable when such ores are associated with a highly silicious gangue. In quartz ores, for instance, containing gold, silver, &c., the present methods of treatment require some form of crushing—as, for instance, in stamp-batteries, Chilean mills, or the like. Such methods demand that water, air, or oil be used as a means of separating the waste materials from the metals, notwithstanding the fact that the losses inseparably connected with any such form of concentration are very great and that these losses are well known. When free gold is found associated with quartz, all present methods demand that it be treated by some form of crushing and water concentration.

The ores found at Butte contain copper, gold, and silver values and are simply mineralized tertiary granite and of course are highly silicious. At present over nine-tenths of the entire ore production of the Butte mines is put through crushing and water concentrating machinery, and the losses in this portion of the treatment amount to more than twenty per centum of the total values.

The object of my present invention is to provide a new form of fire concentration that shall be cheap enough to admit of its use in the recovery of values from various ores, but more particularly from highly silicious ores, in lieu of the present wasteful processes of water concentration.

In producing copper by the bessemerizing process it is customary after the ore or concentrates have been smelted in the blast-furnace or reverberatory furnace and refined thereby into a matte varying approximately from, say, thirty to sixty per centum of copper to transfer such matte into a converter having a lining of from eighteen to twenty-four inches in thickness of silica bonded with sufficient clay to hold the lining in place. When the air-blast is supplied through the twyers, the iron contents of the matte after being oxidized rapidly attack and destroy the silica lining and are thus converted into a silicate of iron slag, which being less in specific gravity floats on top of the molten copper, gold, silver, nickel, &c., and can thus be removed. While this process of converting and purifying copper is to-day in universal use, it has been found to be very expensive and to demand that a number of converter-shells be kept on hand in order to permit of lining and converting being carried on at the same time.

In my improved process of converting copper as described in an application filed by me on January 8, 1903, Serial No. 138,296, I use a water-jacketed converter lined, preferably, with a single layer of basic or other suitable brick, and I use a larger volume of blast and consequently a more intense heat than it is safe or possible to use in any converter that is not protected by a water-jacket. I also use an auxiliary heat that is capable of regulation, particularly in the later stages of the converting process, in order to maintain the temperature of the molten bath to a degree that renders it impossible for the contents of the converter to chill and renders it unnecessary to remove copper noses from the twyers by punching, as at present practiced. Without the auxiliary heat it would be impossible to carry the converting process to a successful finish in a water-jacketed converter, because when the heat of the matte would begin to fail through the elimination of the combustible materials contained therein, or, in other words, when the matte had been purified to the extent that it contained from sixty to ninety per centum of metals, it would solidify, and the converting process while yet incomplete would be brought to a stop.

In my improved method of converting matte as described in an application filed by me on February 24, 1903, Serial No. 144,656, I use in the converter a lining of basic or neutral material, preferably in the form of bricks, so that I do not depend on the converter-lining to supply the flux necessary to satisfy the iron or other contained bases, and I supply the silica or other fluxes as may be required to the converter either before pouring the matte to be converted into the converter or after pouring the matte into the converter or during the process of converting, as may be most convenient.

My present invention consists in using as the fluxing material ores containing metallic values and especially those running high in silica, supplying them to the converter in a solid state, and then heating or fusing them by means of an auxiliary heat in the converter itself either before the matte has been poured into the converter or after the matte has been poured thereinto or during the process of converting while such ore may be floating on the top of the matte or may be associated in any way therewith.

I prefer to use the following procedure:

First. By means of the auxiliary heat to heat the interior of the converter-lining preferably to incandescence.

Second. To feed the ores to be treated through a spout or other suitable medium to the converter by machinery or otherwise intermittently and in comparatively small lots at a time in order that the incandescence of the interior of the converter may readily and quickly heat up and fuse each separate lot. If a large amount of cold ore were delivered into the converter at one time, its chilling effect would be objectionable if not disastrous to the process. Better results will be obtained if the ore be fed intermittently in small successive batches and in pieces small enough so that in striking the bottom of the converter the incandescent brick lining will not be injured by the impact. If the ore be crushed to the consistency of sand, its tendency will be to pack on the bottom of the converter, so that the auxiliary heat cannot act on it and thus fuse it as quickly as when in the form of small pieces.

Third. After the auxiliary heat has heated the ore to be treated, as above described, or has reduced it to a fused or partially-fused state I then prefer to pour the molten matte on top of such heated or fused ore. This has the effect of thoroughly mixing the two, and when the converting-twyers have been brought into action the elimination of the iron and other impurities contained both in the matte and in the ore under treatment, as herein described, is rapidly completed. Should the auxiliary heat fail to fuse any of the silicious ores under treatment, this fact will not obstruct or retard the successful completion of the process, because the heat produced by the converting-twyers is so intense that it will quickly supply such deficiency.

I am aware that many attempts have been made by others to supply silica to the converter other than by means of the lining, but so far as I am aware such attempts have not been successful.

I am also aware that John Hollway in the years 1878 and 1879 in his operations in England added silica containing approximately four or five per centum of iron and sometimes as much as sixteen per centum of moisture, and in this way he accomplished a separation of a portion of the contained iron in the form of a silicate of iron slag after the iron had been oxidized by the blast. It has not, however, been found commercially profitable since that time to convert copper on these lines, and the art as practiced by him is different from my invention, which includes the step of heating or fusing ore by means of an auxiliary heat in a converter having preferably a basic or neutral lining.

In the present art of converting copper the lining alone is depended upon to supply the silica, whereas in my present invention the flux is supplied to the converter in solid form through the medium of ore and is then brought to a heated or fused condition by means of an auxiliary heat. The double purpose of supplying flux to the converter and recovering the values from the ore is thus successfully attained.

I am also aware that at a smelting plant located at Aguas Calientes, in the Republic of Mexico, for some years past a very unusual ore has been utilized in the manufacture of converter-linings. Briefly stated, the practice referred to consists, first, in the use of exceptionally large converters; second, in the use of linings that are said to be sometimes twenty-four inches in thickness; third, in utilizing ores obtained from the St. Gertrude mine near Pachuca, Mexico, which contain approximately eighty per centum of silica in a very pure state, about twenty per centum of clay, with a small amount of gold so finely and evenly disseminated throughout the entire mass that it is possible to line the converters, as stated, with this material in lieu of the pure silica ordinarily used. As the iron of the matte attacks the silica of this lining the gold is liberated from such lining and immediately unites with the copper and is recovered. It will be apparent that ordinary ores could not be used for this purpose, because their mineral contents are not evenly enough distributed throughout the gangue; hence the tendency would be to melt out holes or pockets in the converter-lining, thus making their use dangerous.

My present invention is a new and different art and provides at once a cheap and a very effective method of separating the mineral values contained in any ores from the worthless silicious gangue and entirely without the use of water, and ores suitable for my purpose may contain 82.5 per cent. silica, 1.66 per cent. iron, and 2.5 per cent. sulfur, together with copper and gold or silver values, but ores of varying composition may be employed.

The accompanying drawing shows in vertical section apparatus which is suitable for the practice of my invention, but I desire it to be understood that my claims are not limited thereto and that the apparatus may be modified by those skilled in the art.

In the drawing, 2 is a copper-converter having an interior lining of brick, preferably of neutral or basic material, and contained and supported by a frame 3, which is mounted upon rollers 4, so that the converter may be rocked on its axis into position to receive the charges of matte and flux and into position to discharge the bessemerized contents at the end of the blow. The converter is provided with twyers 5, supplied from a wind-box 6, and with a water-jacket 7, surrounding the lining and provided with inlet and outlet pipes.

The ore flux used in my improved process is supplied from a chute 8, having a gate 9, which may be reciprocated by an eccentric or crank 10 or other suitable mechanism at the desired speed, the purpose being to supply the ore flux in small quantities and at frequent intervals in order to prevent chilling of the interior of the converter.

Those skilled in the art will be able to modify my invention without departing from the spirit of it—for instance, the converter may contain either a basic or a silicious lining, for the silicious ores hereinbefore described may be brought to a heated or to a fused state in such a converter even without a water-jacket without serious or material injury to the lining, providing an auxiliary heat be used, since

What I claim is—

1. The method herein described of recovering values from value-bearing silicious ores, which consists in introducing into a copper-converter such ore in solid lumps or particles, adding molten matte to the converter, bessemerizing the same, and fusing the ore, whereby values are recovered and the gangue of the ore is utilized as a flux; substantially as described.

2. The method herein described of recovering values from value-bearing silicious ores, which consists in introducing into a copper-converter such ore in solid lumps or particles, heating the same with an auxiliary heat, then adding molten matte to the converter, bessemerizing the same and fusing the ore, whereby values are recovered and the gangue of the ore is utilized as a flux; substantially as described.

In testimony whereof I have hereunto set my hand.

RALPH BAGGALEY.

Witnesses:
T. W. BAKEWELL,
H. M. CORWIN.